United States Patent [19]
von Klenck et al.

[11] 3,971,704
[45] July 27, 1976

[54] METHOD AND APPARATUS FOR POLLUTION FREE, DESTRUCTIVELY PROCESSING WASTE

[75] Inventors: Jürgen von Klenck, Dusseldorf; Erich Michel, Essen; Klaus-Dieter Gerstenäcker, Dusseldorf, all of Germany

[73] Assignee: Mannesmann Aktiengesellschaft, Dusseldorf, Germany

[22] Filed: Sept. 10, 1973

[21] Appl. No.: 396,007

[30] Foreign Application Priority Data
Sept. 8, 1972 Germany.......................... 2244753

[52] U.S. Cl.................................. 201/2.5; 201/27; 201/29; 201/30; 201/32; 201/37; 201/40; 202/99; 202/100; 202/108; 202/109; 202/131
[51] Int. Cl.².............................................. C10B 51/00
[58] Field of Search.................. 201/2.5, 25, 13–15, 201/27, 29, 28, 30, 31, 32, 34, 36, 37, 38, 43; 202/99, 100, 108, 109, 131

[56] References Cited
UNITED STATES PATENTS

| | | | |
|---|---|---|---|
| 1,781,934 | 11/1930 | Snyder.............................. | 201/2.5 X |
| 3,505,201 | 4/1970 | Hodgson et al...................... | 201/31 |
| 3,519,539 | 7/1970 | Schulte.............................. | 201/34 |
| 3,525,674 | 8/1970 | Barnebey.......................... | 201/2.5 X |
| 3,562,115 | 2/1971 | Dunlop............................... | 201/31 |
| 3,660,245 | 5/1972 | Zelnik et al........................ | 201/2.5 |

Primary Examiner—Wilbur L. Bascomb, Jr.
Attorney, Agent, or Firm—Ralf H. Siegemund

[57] ABSTRACT

Waste, preferably in a pre-dried state, is passed through a carbonizing oven chamber, from the top towards the bottom and is carbonized therein through interaction with a counter flow of heated gas; that gas together with carbonization gas is taken from the chamber and pre-cleaned (to remove condensates); a portion of the pre-cleaned gas is heated and used as carbonization producing and sustaining gas; the remainder of the pre-cleaned gas is washed and used otherwise, for example, as combustion fuel in a heater for the pre-cleaned gas that will then be used as carbonizing agent. The carbonizing oven chamber can be of various construction such as a pit furnace or a revolving oven. Preferred is to commence carbonization of waste in the chamber through a thermo shock.

18 Claims, 5 Drawing Figures

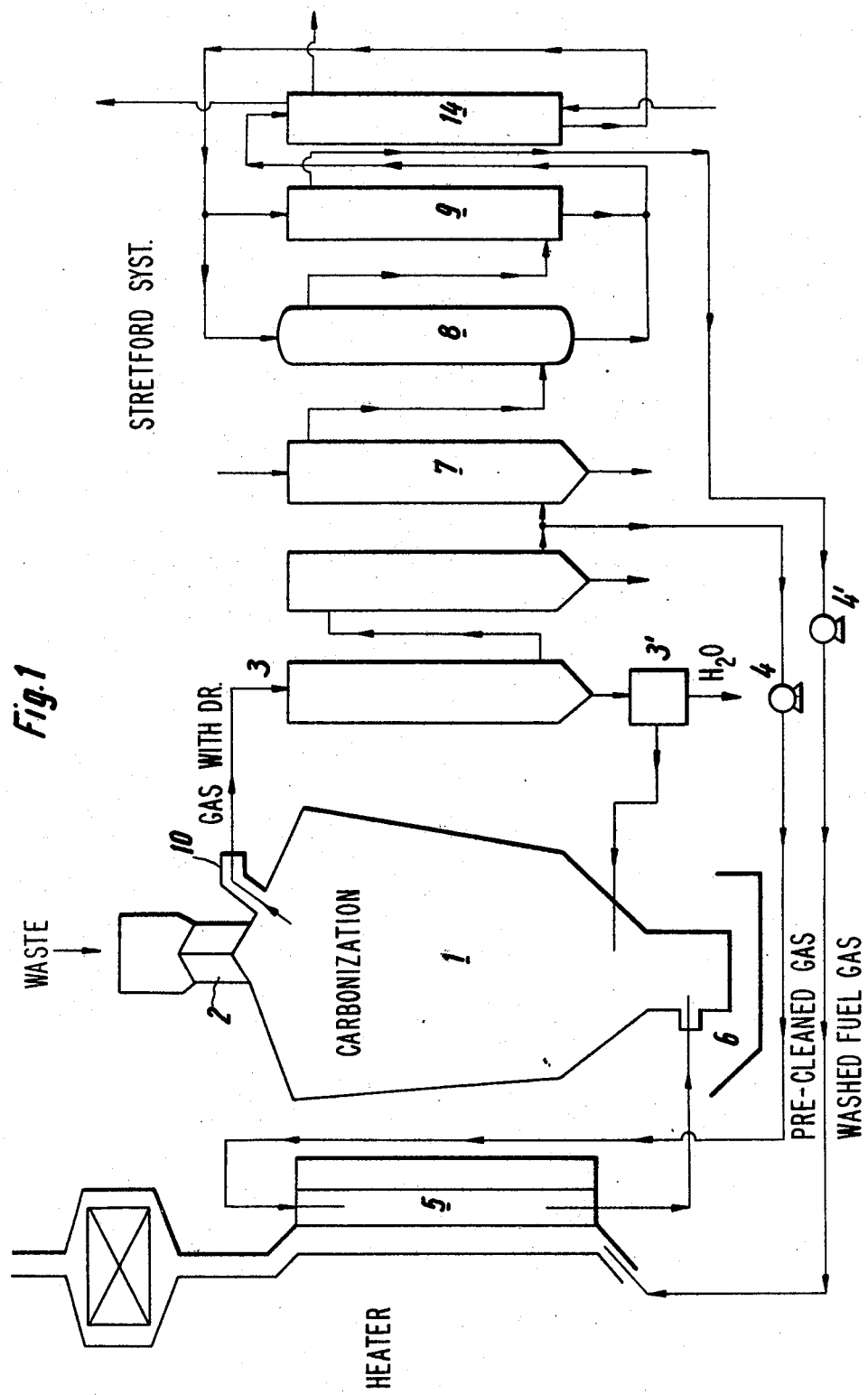

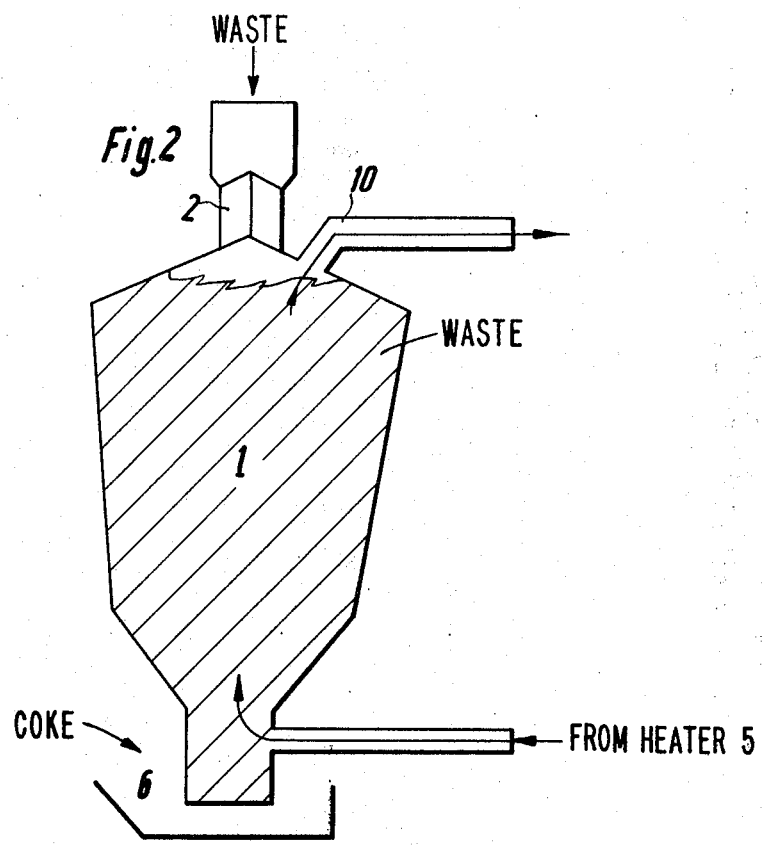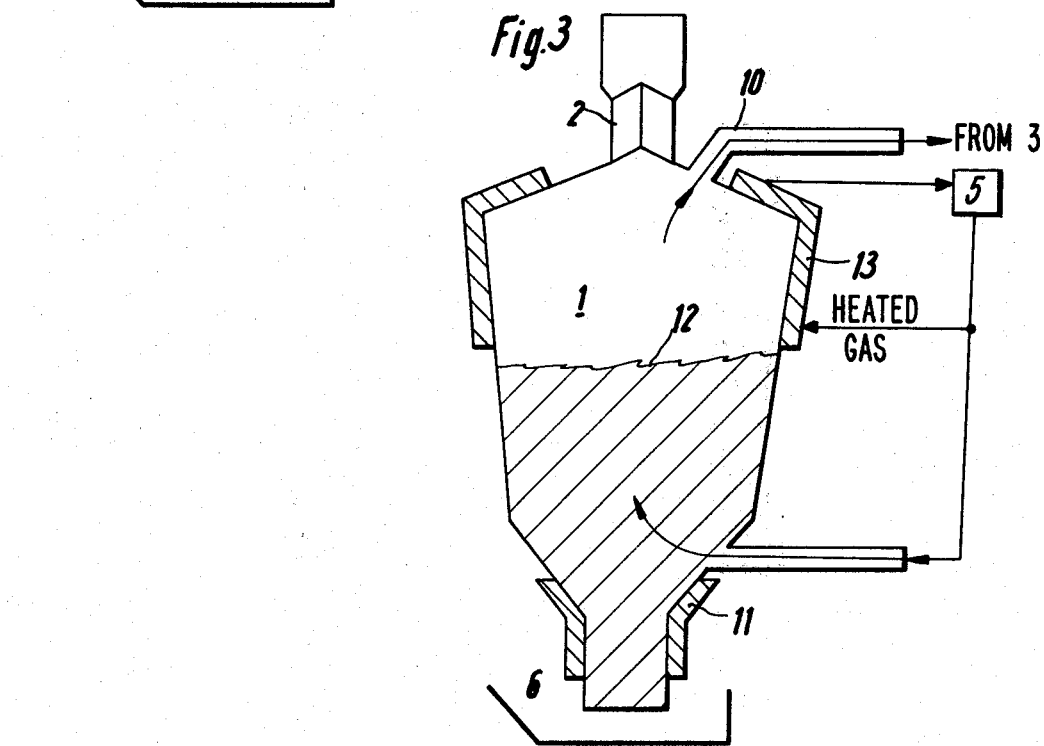

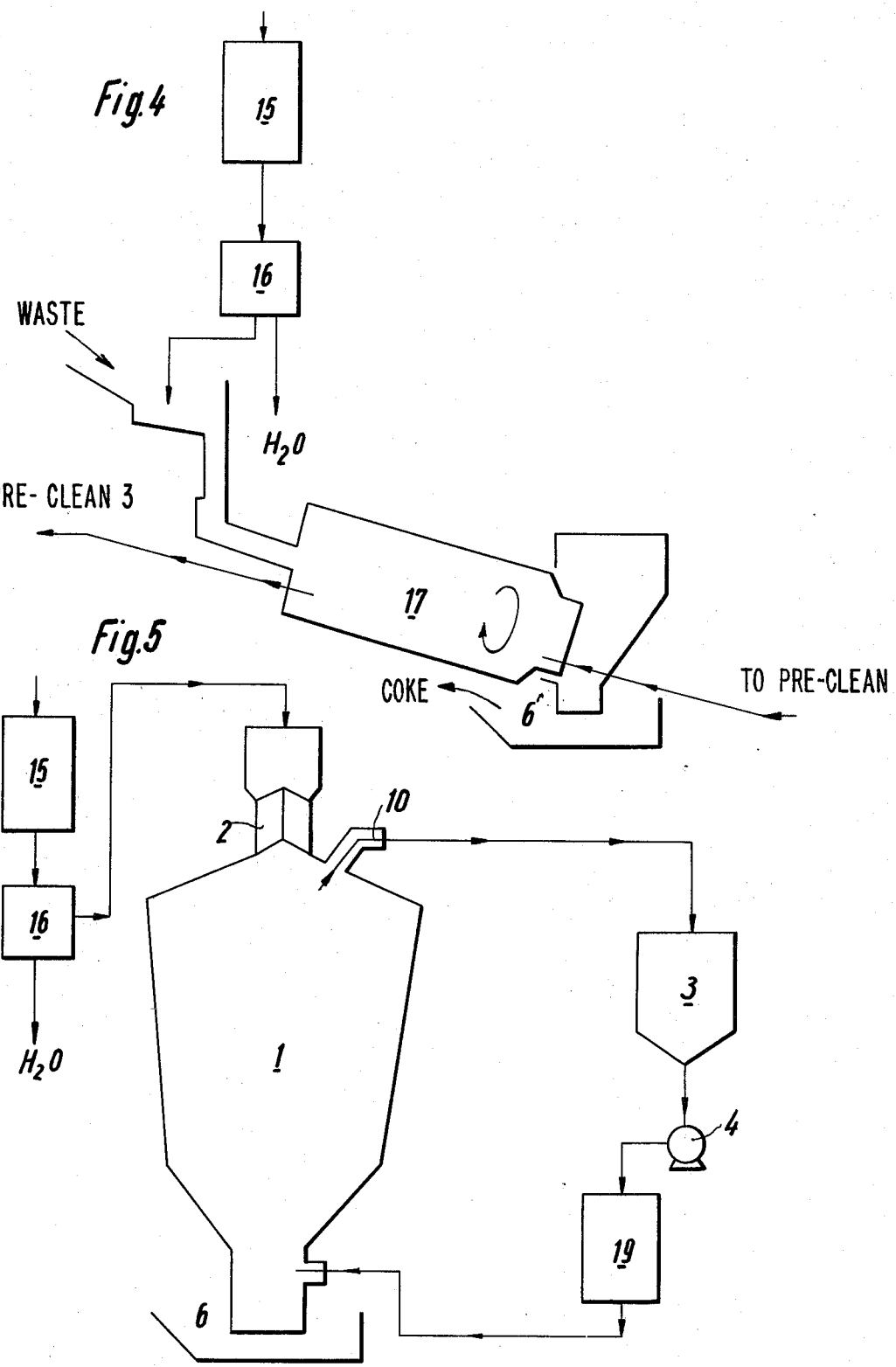

METHOD AND APPARATUS FOR POLLUTION FREE, DESTRUCTIVELY PROCESSING WASTE

BACKGROUND OF THE INVENTION

The present invention relates to a method and apparatus for destructively disposing waste without contaminating and polluting the environment. More particularly, the invention relates to waste processing by means of dry distilling (carbonization) and separating gaseous and solid products as resulting therefrom.

Waste disposal by means of just depositing the waste, letting it decay or burning the waste contaminates the environment in one form or another; solid, liquidous or gaseous decomposition products provide for pollution and other forms of contamination of the environment. Thus, a variety of waste products cannot or should not be processed in that manner because, for example, underground water will be contaminated and burning of some waste produces hydrochloric acid, sulfurous acid, hydrofluoric acid and other air pollutants.

In accordance with a known method, waste is dry-distilling, i.e. carbonized, and reduced to an ash-containing coke and the gas developed during the reduction is cleaned and used as combustion fuel and energy source for sustaining the carbonization. The fumes resulting from burning that gas do not pollute the air due to the prior cleaning. The known methods here, however, have the drawback that waste has usually a very low thermal conductivity, so that carbonization occurs only rather close to the oven chamber wall. Accordingly, the oven diameter must be quite small. In the case of using a relatively large oven, waste in the interior of the oven chamber will not be completely carbonized.

SUMMARY OF THE INVENTION

It is an object of the present invention to provide for a method and apparatus or system for reducing waste in a carbonizing process without polluting the environment and wherein waste is reduced independently from the distance to the oven chamber wall; i.e. independently from the diameter dimensions of the oven.

In accordance with the preferred embodiment of the invention, it is suggested to feed waste into a carbonizing oven from above and withdrawing it near the bottom of the carbonization chamber. Gas is withdrawn from the chamber and pre-cleaned; some of this pre-cleaned gas is heated and the heated gas is passed into the oven chamber from below in counter flow fashion. The excess gas is washed as usual and used otherwise. Thus, the waste is reduced under exclusion of air, and the heat required for the endothermic pyrolytic reduction of waste to coke is taken from that recirculated gas. The carbonizing process is, therefore, no longer dependent on any heat transfer between oven wall and chamber. Rather, the gas as carrier of thermal energy penetrates the oven interior in its entirety and everywhere. Thus, the thermal conductivity of waste is no longer a material factor that has to be considered. All volatile material produced resulting from carbonization are carried along and are either recirculated or removed. The dimensions of the oven are only determined by the desired throughput of waste to be carbonized.

It can, thus, be seen that a circulation of gas is sustained through the oven chamber for maintaining carbonization therein, and through pre-cleaning and reheating. That circulation is continuously augmented by gas that develops during the carbonization so that the gas flow outside of the chamber must be reduced, preferably also continuously by that amount. The excess gas after washing is preferably used as combustion fuel in the gas heater.

Waste that includes organic products such as paint, plastic etc., with a potentially poisonous content are safely processed and destroyed by this process. Acids or lye or leach are evaporated and withdrawn from the oven in the gaseous state, without discharge into the environment. The coke, possibly heavily mixed with ashes as taken from the oven, is free from contaminants that could damage the environment.

The gas taken from the oven and ultimately taken out of the circulation, will actually be cleaned in a two step process. The first step, also called pre-cleaning, succeeds a cooling step and serves primarily for removing precipitated condensates. Some of the pre-cleaned gas is then heated and passed into the carbonizing oven from below. The temperature to be attained should at least be as high as the temperature needed for sustaining carbonization and coking. Only that portion of the gas which is not needed as carrier of thermal energy, is subjected to the second cleaning step. This second cleaning step provides for washing the gas to remove contaminants so that it can be used, e.g., as combustion fuel in the gas heater. In accordance with another feature of the invention, the heating gas is moved by an injector obviating the need for a compressor such as piston or rotary compressor. Such units usually wear out fast under friction.

Preferably, the waste is pre-dried; the resulting vapor is condensed and (solid) condensate is separated from the water. The solid condensate is, e.g. returned to the waste. Pre-drying permits considerable reduction in the amount of thermal energy needed for carbonizing the waste. The condensate is treated as waste and carbonized therewith. The condensate could be atomized separately above the coke bed in the carbonizing oven, or one could introduce the condensate separately into the hot coke-to-be. Still alternatively, the condensate could be evaporated in the gas heater and fed therewith into the coking chamber.

In accordance with another feature of the invention, the carbonizing oven may operate with internal heating as per the principle feature of the invention coupled with external heating. This way, heat loss from the interior of the carbonizing chamber through radiation is avoided and greater uniformity of the carbonizing process in the interior as well as in the peripheral portions of the carbonizing chamber is enhenced. Also, caking of a waste-coke mixture on the internal oven wall is avoided. External heating can be provided for through combustion of cleaned gas as withdrawn from the circulation and inside of ducts in the oven wall. Alternatively, one can use a separate circulation as between gas heater oven wall ducts (no combustion), and the carbonizing agent gas is tapped from that circulation and fed to the carbonizing chamber as stated.

The carbonizing process can be conducted under two basic conditions (or suitable combinations thereof). In one case, the oven is substantially filled with waste. Fresh waste is added to the top near the top entrance and coke is withdrawn from the bottom. Waste, as converted to coke, sags gradually down and the carbonizing, heat carrying gas flows in opposite direction through the voids, gaps and spaces in the otherwise filled oven. In the second case, the oven is only about half filled with waste in the steady state of operation. The upper half of the oven chamber is filled with hot gas, and fresh waste drops through that space and hits the red-hot surface level of the waste content in the oven. As a consequence, the waste experiences a thermo shock, which is beneficial for cracking any hydrocarbons, right in the beginning of the carbonizing process. This enhences the carbonizing of the waste as a whole, and particularly the reduction of higher valued hydrocarbons.

The oven used for carbonization may be constructed as a pit furnace. Such oven carbonizes (dry distilling) any kind of waste and is relatively inexpensive. The furnace is suitably closed at the top by structure that permits admission of waste without discharge of gas. Gas is taken separately from the oven chamber. The bottom of the oven is closed by a water seal with quenching tank through which the waste coke is removed under quenching. Also near the bottom are entrance openings for the hot gas; the gas admitting structure can be constructed such as the vent pipes for a blast furnace in iron smelting facilities. However, other structures for admitting hot gas to the carbonizing furnace can be used.

In accordance with another feature of the invention, a rotating furnace can be used, particularly when waste-coke caking could be a severe problem, or when gas is extensively developed during carbonization. The rotating chamber causes the waste continuously to tumble and opens continuously new passages for the carbonizing gas.

In accordance with a further development of the invention, at least two gas heaters are provided, but one only needs to work at any instant, while the other one is cleaned to remove caking from the wall, e.g. through burning.

The heating arrangement may also be comprised of an injector feeding heating gas to a sandcracker from which the heated gas is fed to the carbonizing oven. The gas is heated in the sandcracker to have the required carbonizing temperature when entering the oven.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a schematic view of an apparatus and system for practicing the inventive method, the illustration can also be interpreted as a flow chart diagram;

FIG. 2 shows schematically a carbonizing oven for use in the system of FIG. 1 and in somewhat greater detail;

FIG. 3 shows a modified carbonizing oven with local supplementing external heating and local cooling;

FIG. 4 shows schematically a modification for the system of FIG. 1; and

FIG. 5 shows another modification for the system of FIG. 1.

Proceeding now to the detailed description of the drawings, FIG. 1 shows a carbonizing oven which is constructed to resemble a pit furnace. A bell and hopper-like lock or furnace top distributor 2 is provided on top of oven 1 and admits waste as indicated by the vertical, down-pointing arrow thereabove. As will be described more fully below, the waste is carbonized in oven 1 in a dry, reducing process. Gas developed (or passing through) oven 1, is withdrawn at 10 and passed to a pre-cleaning station 3 for removing precipitating components. The resulting condensation product comprised predominantly of tar and dirty water. Station 3' removes the water from that condensation product, and the residue is returned to oven 1 for further reduction. One could, however, utilize the tar otherwise.

Some of the gas as leaving station 3 is passed from above into a pipe or tube heater 5 by means of an injector 4. Heater 5 heats the gas and, thus, adds to it, so to speak, thermal energy, which the gas is to carry into the oven 1. The bottom of oven 1 is closed by a water seal, serving also as quenching tank for coke as removed from oven 1. The heated gas is admitted to the oven through or above that seal. The hot gas flows up in the oven chamber and through the entire cross section of the chamber and uniformly carbonizes the down sagging waste. The heated gas together with the gas developed during the carbonization is withdrawn at 10.

Inherently, excess gas develops when the system runs under stable conditions and some of the gas, equal in quantity to the amount that develops, is branched off from the re-circulation path at the output of pre-cleaning station 3 and passed to a wet washing station 7, from there to a nozzle washer 8, a hurdle washer 9 and an oxidizer 14, in that sequence, for removing sulfur under the Stretford method. The cleaned gas is used as heating agent (combustion fuel) for the heater 5. Not all such cleaned gas may be needed for heating, excess can be used otherwise. In either case, that gas is clean and when burnt does not pollute the air.

The heater 5 could be duplicated or even more than two heaters could be run in parallel. Since the pre-cleaned gas still contains the products that are washed in the stations 7 to 9, and 14, one must expect that some precipitation occurs on the heater wall building up a cake that reduces the cross section and increases the heat transfer from the combustion to the pre-cleaned gas to be heated. Thus, occasional cleaning of the water is necessary. In order to avoid interruption of the operation as a whole, an individual heater can be shut down while one or more heaters continue to work until they need cleaning etc.

The carbonizing process will now be described in some greater detail with reference to FIG. 2. The chamber of oven 1 is filled with waste up to the top, i.e. up to the location of lock 2. Hot gas (as heated in heater 5, FIG. 1) passes through the waste in counter flow and heats the same for progressively reducing the waste to coke. The carbonizing gas carries along all volatile components as produced during the coking process. Coke is continuously removed through the water seal and quenched while fresh waste is charged from above.

A somewhat different carbonizing oven is shown in FIG. 3. The oven is constructed as pit furnace and the carbonizing process does not exclusively depend on gaseous heating as per FIG. 2. Rather, the oven chamber is provided with an external heating facility. The chamber is filled only by about half of its capacity with waste. Taking into consideration that the carbonizing gas as passing through in up direction looses thermal energy, the upper portion of the chamber is heated to heat up again the gas as it collects above surface level 12 of the waste. The surface 12, therefore, is maintained red hot.

The carbonizing gas is fed to chamber 1 at a level so that about one third of the volume is below that level. As the hot gas flows predominantly up from the entrance, coke in the lower portion will already begin to cool. That cooling may be enhenced by a jacket cooling device 11 of the oven chamber, so that the coke as extracted is not too hot, and steam and other water vapor is not developed in excessive amounts during quenching in the water seal.

Since the upper half of the oven is not filled with waste, it is filled with hot gas instead, and the thermal energy of the gas is replenished by the external heating facility 13 as stated. Waste is charged continuously through entrance 2 and falls through that upper half of the oven chamber onto the red hot upper surface 12 of the waste in the chamber. This then amounts to a heat shock treatment of the waste as newly charged. Such thermal shock facilitates the breaking up of higher valued hydrocarbons, and accelerates the reduction of the waste as a whole. Gas is removed from the chamber at 10 as before.

The heating device 13 may include ducts in the wall of the furnace and some of the washed gas not used for running heater 5, can be used to heat the furnace. Alternatively, one can provide another gas circulation as is specifically illustrated. The (pre-cleaned) gas as heated in heater 5 is run through ducts in the wall of oven 1 for indirect heating, and is returned to the heater together with newly pre-cleaned gas as pumped, e.g. by injector 4 (FIG. 1). A portion of that circulation is tapped and branched off and used as carbonizing gas for the interior of oven 1.

FIG. 4 shows equipment for pre-drying the waste in a drier 15. The vapor developed in the drier is condensed in condenser 16, and the water is separated from the condensation product. The more or less solid condensation residue and dried waste are combined again and fed to oven 17. Alternatively, the condensation product may be atomized as injected directly into gas filled space of the carbonizing oven. Still alternatively, the condensation product may be fed into the oven at a lower level.

In this particular case, another type of oven is depicted. The oven may be of the rotating or revolving variety having a slightly inclined axis of rotation, and the charge entrance is located at the somewhat elevated end. Coke is discharged from the lower end through a water seal 6'. The heated and cleaned coke gas is used also here as heat carrying carbonizing agent, flowing through the oven 17 and in counterflow through the rotating, tumbling and gradually downward moving waste. The remaining portions of the system are the same as in FIG. 1, particularly as far as the circulation of the gas is concerned.

Turning now to FIG. 5, the supplementing apparatus shown here relates also to pre-drying the waste in a drier 15 with condensation product water separation at 16. The dried waste is fed to an oven of the type shown in FIGS. 1, 2 or 3. Gas removal (10) and pre-cleaning (3) is the same as before. The pre-cleaned gas to the extent it is to be used as carbonizing agent is heated in a sandcracker 19 before being fed to oven 1.

The invention is not limited to the embodiments described above but all changes and modifications thereof not constituting departures from the spirit and scope of the invention are intended to be included.

We claim:
1. Method for destructively processing waste comprising the steps of:
feeding the waste into a chamber from above for carbonizing therein under exclusion of air and withdrawing coke adjacent the bottom of the chamber;
separating gas from the upper portion of the chamber and pre-cleaning the separated gas;
heating a portion of the pre-cleaned gas external to the chamber to a temperature sufficient to sustain the carbonization of waste in the chamber as pyrolytic reduction;
feeding said heated portion gas into the chamber below the top thereof for upward passage therein to obtain the carbonization of waste in the chamber in counter flow, whereby the gas mixes with gaseous carbonization products as resulting from the reduction of the waste, to be withdrawn therewith pursuant to said separation step; and
washing that portion of the pre-cleaned gas not fed to the chamber for obtaining the carbonization.
2. Method as in claim 1, wherein the washed gas is used for heating said portion of the pre-cleaned gas through combustion.
3. Method as in claim 1, including the step of pre-drying the waste before feeding it to the chamber; condensing the vapor as resulting from the pre-drying; separating water from the condensate, and feeding the condensate as waste into the chamber for carbonization therein.
4. Method as in claim 1, and maintaining a waste surface level in the chamber below the top thereof, the space above the surface level being filled with gas at carbonizing temperature, the waste as fed to the chamber falling through said space and impacting on the red hot waste.
5. Method as in claim 4, and heating externally the space above the surface level.
6. Method as in claim 1, including the step of externally heating the carbonization chamber.
7. Method as in claim 6, including the step of providing for said heating by using said external heated gas.
8. Method as in claim 1, using a pit furnace-like oven for carbonizing waste.
9. Method as in claim 1, using a revolving furnace for carbonizing waste.
10. Method as in claim 1, using at least two heaters for heating the pre-cleaned gas so that at least one heater is available at all times permitting cleaning of either heater.
11. Apparatus for destructively processing waste, comprising:
a carbonizing chamber receiving waste to be carbonized from the top and having means for withdrawing coke from adjacent the bottom, further having means for withdrawing gas from the upper portion of the chamber, the chamber constructed to exclude air;
means connected for pre-cleaning the gas as withdrawn from the chamber;
means outside of the carbonization chamber and connected for heating the pre-cleaned gas to a temperature sufficient to sustain carbonization of waste in the chamber;
means connected to the means for heating, for feeding the heated gas portion into the chamber below the top thereof for upward passage of the heated gas as fed in the chamber to obtain the carbonization of waste in the chamber; and means for washing that portion of the pre-cleaned gas not fed to the chamber for obtaining the carbonization.

12. Apparatus as in claim 11, including means for pre-drying the waste prior to being received by the chamber.

13. Apparatus as in claim 11, including means for externally heating the carbonization chamber.

14. Apparatus as in claim 11, wherein the carbonization chamber is defined by pit furnace-like oven.

15. Apparatus as in claim 11, wherein the carbonization chamber is defined by a revolving furnace.

16. Apparatus as in claim 11, wherein an injector is disposed for propelling the pre-cleaned gas through the means for heating and into the chamber.

17. Apparatus as in claim 16, wherein the means for heating is a sandcracker.

18. Apparatus as in claim 11, wherein the means for heating is connected to the means for washing, for receiving and using the washed gas as combustion fuel.

* * * * *